United States Patent
Gabella et al.

(10) Patent No.: US 7,025,428 B2
(45) Date of Patent: Apr. 11, 2006

(54) AXLE FOR VEHICLES, IN PARTICULAR COMMERCIAL VEHICLES

(75) Inventors: Giovanni Gabella, Ludwigsburg (DE); Guenter Niebauer, Hochdorf (DE)

(73) Assignee: DaimlerChrysler, Stuttgart (DE)

( * ) Notice: Subject to any disclaimer, the term of this patent is extended or adjusted under 35 U.S.C. 154(b) by 0 days.

(21) Appl. No.: 10/363,708

(22) PCT Filed: Aug. 28, 2001

(86) PCT No.: PCT/EP01/09869

§ 371 (c)(1), (2), (4) Date: Aug. 22, 2003

(87) PCT Pub. No.: WO02/20290

PCT Pub. Date: Mar. 14, 2002

(65) Prior Publication Data

US 2004/0041463 A1 Mar. 4, 2004

(30) Foreign Application Priority Data

Sep. 6, 2000 (DE) .................. 100 43 802

(51) Int. Cl.
*B60B 35/00* (2006.01)

(52) U.S. Cl. .................. 301/125; 280/124.17; 267/52
(58) Field of Classification Search ............ 301/124.1, 301/125, 137; 74/606 R, 607; 280/124.1, 280/124.109, 124.164, 124.165, 124.17, 280/124.171, 124.175; 267/52
See application file for complete search history.

(56) References Cited

U.S. PATENT DOCUMENTS

| | | | | |
|---|---|---|---|---|
| 1,209,670 A | * | 12/1916 | Chriswell | 280/482 |
| 1,421,819 A | * | 7/1922 | O'Connor | 267/205 |
| 1,908,335 A | * | 5/1933 | Evans | 301/124.1 |
| 2,044,389 A | * | 6/1936 | Kay | 301/124.1 |
| 2,072,198 A | * | 3/1937 | Davis | 301/124.1 |
| 2,148,714 A | * | 2/1939 | Urschel | 301/124.1 |
| 2,218,127 A | * | 10/1940 | Urschel | 301/124.1 |
| 2,274,518 A | * | 2/1942 | Baker | 267/52 |
| 2,752,673 A | * | 7/1956 | Williams | 29/463 |
| 3,015,238 A | * | 1/1962 | Williams | 74/607 |
| 3,901,494 A | | 8/1975 | Sena | |
| 3,913,937 A | * | 10/1975 | Longworth et al. | 280/680 |
| 3,970,166 A | * | 7/1976 | Sheppard | 180/400 |
| 4,519,589 A | * | 5/1985 | Skynar | 267/52 |
| 5,354,091 A | * | 10/1994 | Baxter et al. | 280/683 |
| 5,470,096 A | | 11/1995 | Baxter | |
| 5,979,920 A | | 11/1999 | Krakowiak et al. | |
| 6,086,162 A | * | 7/2000 | Pinch et al. | 301/124.1 |
| 6,102,417 A | * | 8/2000 | Moore | 280/124.1 |
| 6,196,563 B1 | * | 3/2001 | Haycraft | 280/93.512 |
| 6,412,879 B1 | * | 7/2002 | Ogoniek et al. | 301/125 |

FOREIGN PATENT DOCUMENTS

DE 297 13 996 1/1999

* cited by examiner

*Primary Examiner*—Russell D. Stormer
*Assistant Examiner*—Jason R. Bellinger
(74) *Attorney, Agent, or Firm*—Kenyon & Kenyon

(57) ABSTRACT

For an axle for vehicles, e.g., commercial vehicles, with a rigid axle body, axle guidance and/or axle support is provided, making it possible to adapt to different transverse distances in the axle guidance or axle support which are predetermined on the body side.

20 Claims, 5 Drawing Sheets

AXLE FOR VEHICLES, IN PARTICULAR COMMERCIAL VEHICLES

FIELD OF THE INVENTION

The present invention relates to an axle for vehicles, e.g., commercial vehicles.

BACKGROUND INFORMATION

Axles of the abovementioned type are described, for example, in German Published Patent Application No. 297 13 996 and include, as functional elements associated with axle guidance and/or axle support, carrying arms which are fastened pivotably at one end to the vehicle body and, at the end located opposite in the longitudinal direction of the vehicle, form the support for a pneumatic spring. These functional elements are assigned, on the axle body, counterelements which include mounting parts in the form of flanged plates which are provided, on their mutually confronting surfaces directed toward the axle body, with guides form-fitting relative to the axle body and on one of which the carrying arm is seated, secured in a form-fitting manner, on the side facing away from the axle body, the carrying arm and the flanged plates being braced via spring clips which are configured as yokes which are parallel to a vertical plane containing the axle center line and which engage over the carrying arm and, passing through the flanged plates laterally relative to the axle body, are braced at their lower end remote from the carrying arm via nuts, so that a fastening plane is predetermined. For the form-fitting assignment of the mounting parts to the carrying arm serving as a carrying and/or guiding body, there are functional parts which are at a predetermined distance from the fastening plane and thus also define a predetermined position of the respective carrying arm, as a functional element, with respect to the fastening plane.

It is an object of the present invention to provide an axle, e.g., to the effect that, without any action being taken on its structure, it is possible to adapt to different vehicle conditions in terms of the distance of the functional elements associated with axle guidance and/or axle support from the axle transverse mid-plane or the vehicle longitudinal mid-plane.

SUMMARY

According to the present invention, this may be achieved by providing an axle, as a result of which the axle-side counterelements to the functional elements associated with axle support may be adapted to different distances of the functional elements from the vehicle longitudinal mid-plane, in that the mounting part assigned in each case to a counterelement may be positioned with its functional part in different positions in relation to the axle body and to the fastening plane, without action otherwise being taken on the axle construction.

For this purpose, it may be provided, in particular, to give the mounting parts, in particular in the form of flanged plates, an independent fastening with respect to the axle body, e.g., as a releasable fastening particularly in the form of a screw connection which, in its assignment to the axle body, makes it possible in structural terms to fix a fastening plane, in relation to which, in the case of an offset of the associated functional part in relation to the fastening plane, the respective mounting part may be connected to the axle body such that, for the functional part, different distances from the axle transverse mid-plane in the various assembly positions are obtained, the distances making it possible to adapt to different distances of the functional elements from the vehicle longitudinal mid-plane or from the axle transverse mid-plane, or vice versa.

If, for example, a rigid spring carrier, a leaf spring, etc., is provided as a functional element associated with axle support, then, with this functional element tied up to the flanged plate as the axle-side counterelement, spring tracks having a different distance from the vehicle longitudinal mid-plane may thereby be formed, so that correspondingly changed body conditions may be taken into account on the axle side.

If a fixed stop provided on the frame side, for example in the form of a rubber buffer, is provided as a functional element associated with axle support, then this fixed stop, when assigned to a side member of the vehicle frame and to different frame configurations, may necessitate a corresponding adaptation on the axle side, and this may take place by the transverse displacement of the functional part, in that the flanged plate, as a mounting part, is provided with, as a functional part, a stop surface which, by virtue of its positioning with respect to the axle body, makes it possible to have different distances from the axle transverse mid-plane.

Depending on which functional element of axle guidance and/or axle support requires an offset in the vehicle transverse direction with respect to its axle-side counterelement in terms of the respective design conditions, the attached flanged plate, as an integral part of the counterelement, may have its functional part aligned with this functional element, the attached flanged plate being capable of being assigned to the top side or else the underside of the axle, this being achieved in the position necessary in each case with respect to its screw-connection plane.

Within the scope of the present invention, it may be provided to connect, for example, to weld, a flanged plate to the axle body in a form-fitting and/or materially integral manner and to screw the attached flanged plate carrying the functional part with respect to this flanged plate which is fixed relative to the axle body, e.g., the screwing plane, as a fastening plane, forming a plane perpendicular to the axle center line. Instead of a screw connection with the fastening plane defined by the screwing axes, the fastening plane may also be predetermined in another manner in structural terms, a position, e.g., being one in which the screw connections are symmetrical to the fastening plane. Screw connection takes place, e.g., via screw bolts in relation to the flanged counterplate fixed relative to the axle body, the screw bolts being screwed into the flanged counterplate. This may provide the possibility of arranging the flanged counterplate as a carrier of a leaf spring, of a leaf-spring assembly or of an axle carrier, for example, for pneumatic spring elements, these parts associated with axle guidance or axle support being screwed with respect to the flanged counterplate, e.g., via screw connections which are symmetrical to the screwing plane of the screw connection between the two flanged plates.

In particular, an example embodiment according to the present invention may provide in conjunction with an arrangement in which the attached flanged plate forms the counterelement for a body-side fixed stop as a functional element, and in which the flanged counterplate, assigned to the axle underside, is a carrier for a leaf spring, a leaf spring assembly or an axle carrier, the relevant screw connection taking place, starting from below, e.g., via screw bolts which are assigned blind-hole receptacles in the flange counterplate, so that no water may penetrate from above and the blind holes also may not form a build-up space for water, which will be conducive to rusting-in.

Further aspects and features of the present invention are explained below with reference to an exemplary embodiment.

BRIEF DESCRIPTION OF THE DRAWINGS

FIG. 3 is a view corresponding to that of FIG. 1, the axle-side flanged plates associated with axle support and provided as counterelements being illustrated in the position offset at 180° relative to the illustration according to.

FIG. 1.

DETAILED DESCRIPTION

Figure 1:
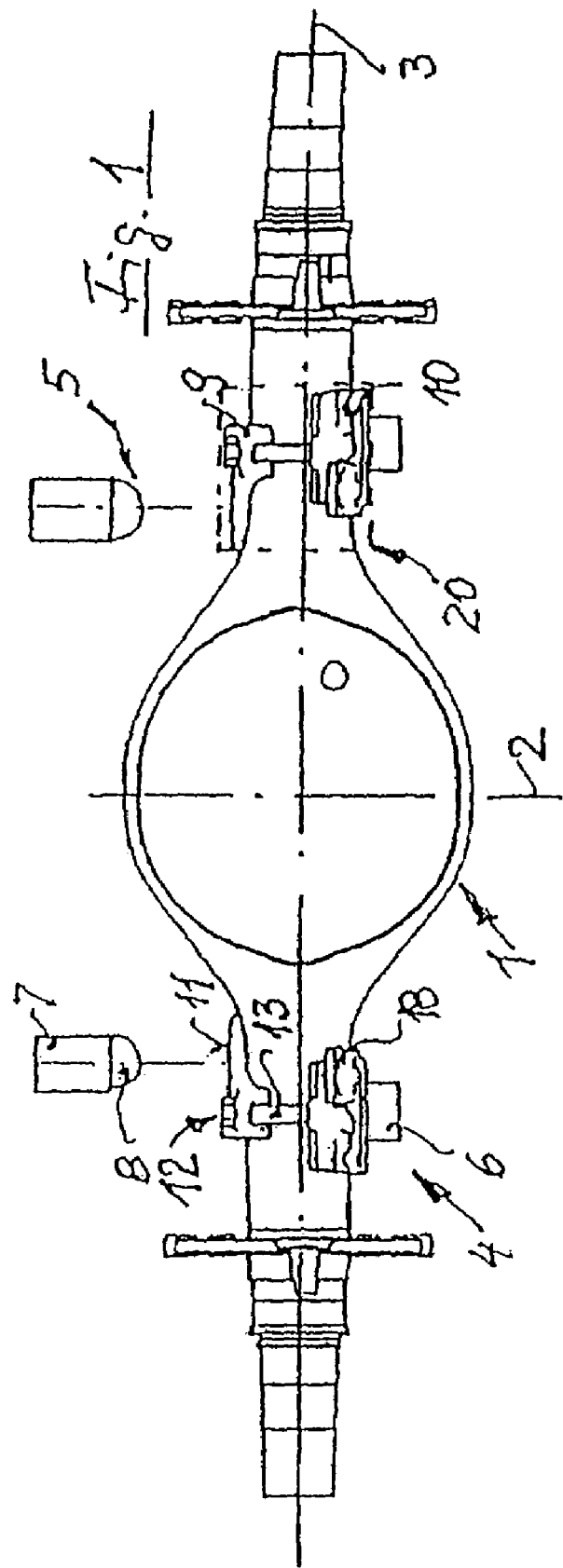
FIG. 1 is a schematic view of an axle for a commercial vehicle, with a suggestion of functional elements serving for axle guidance and of those serving for axle support, as regards the latter their axle-side counterelement being formed by a flanged plate.

The Figures illustrate an axle for commercial vehicles in highly schematic views, and reduced to the elements essential for understanding the present invention, 1 designating the rigid axle body which is arranged essentially symmetrically to the longitudinal mid-plane designated, in relation to the vehicle, by 2. The longitudinal center line of the axle body 1 is designated by 3.

The axle includes functional elements associated with axle guidance and/or axle support, in an exemplary embodiment a functional element serving for axle guidance being indicated at 4 and a functional element serving for axle support being indicated at 5. The axle-guidance element 4 is, for example, a side member 6 which is held on the vehicle body at a distance from the axle body 1 via pneumatic springs. Instead of the side member 6, for example, a leaf spring may also form the axle-guidance element 4, and this leaf spring may also additionally assume a supporting function.

The axle-support element 5 is illustrated by a stop buffer 8 provided on the frame member 7. The functional elements 4 and 5 forming axle guidance and axle support and being in the form of the side member 6 and the stop buffer 8 respectively have corresponding to them, on the axle side, counterelements which are designated as a whole by 20 and, in the exemplary embodiment, include flanged plates 9 and 10. In this case, the connection of the side member 6 or of a longitudinal leaf spring 6 provided at this point to the axle body 1 is illustrated via the flanged plate 10, while the flanged plate 9 in the stop buffer 8 of the axle-support element 5 is located opposite.

The position and assignment relative to the axle body is explained in more detail below in terms of the flanged plate 9, and, contrary to the exemplary embodiment illustrated, the same also applies accordingly, within the scope of the present invention, to the flanged plate 10, so that, if appropriate, the flanged plates 9 and/or 10 may have to be arranged, transposed, in a manner according to the present invention.

In view of the foregoing, there is no restriction if, in the exemplary embodiment, the flanged plate 10 associated with the underside of the axle body 1 and forming the guide for the side member 6 is connected to the axle body 1 in a form-fitting and/or materially integral manner, for example, by welding, and only the opposite flanged plate 9 assigned to the top side of the axle body in the exemplary embodiment is attached onto the axle body 1 and is displaceable relative to the latter in a manner according to the present invention.

The flanged plate 9 assigned to the functional element 5 is connected via a screw connection to the flanged plate 10 permanently assigned to the axle body 1 in the exemplary embodiment for the sake of simplicity. The screw connection is designated by 12, and, in the exemplary embodiment, it is made via two screw bolts 13 which, starting from the side facing away from the axle body 1, pass through the flanged plate 9 and are screwed into corresponding receiving bores in the flanged plate 10.

Figure 5:
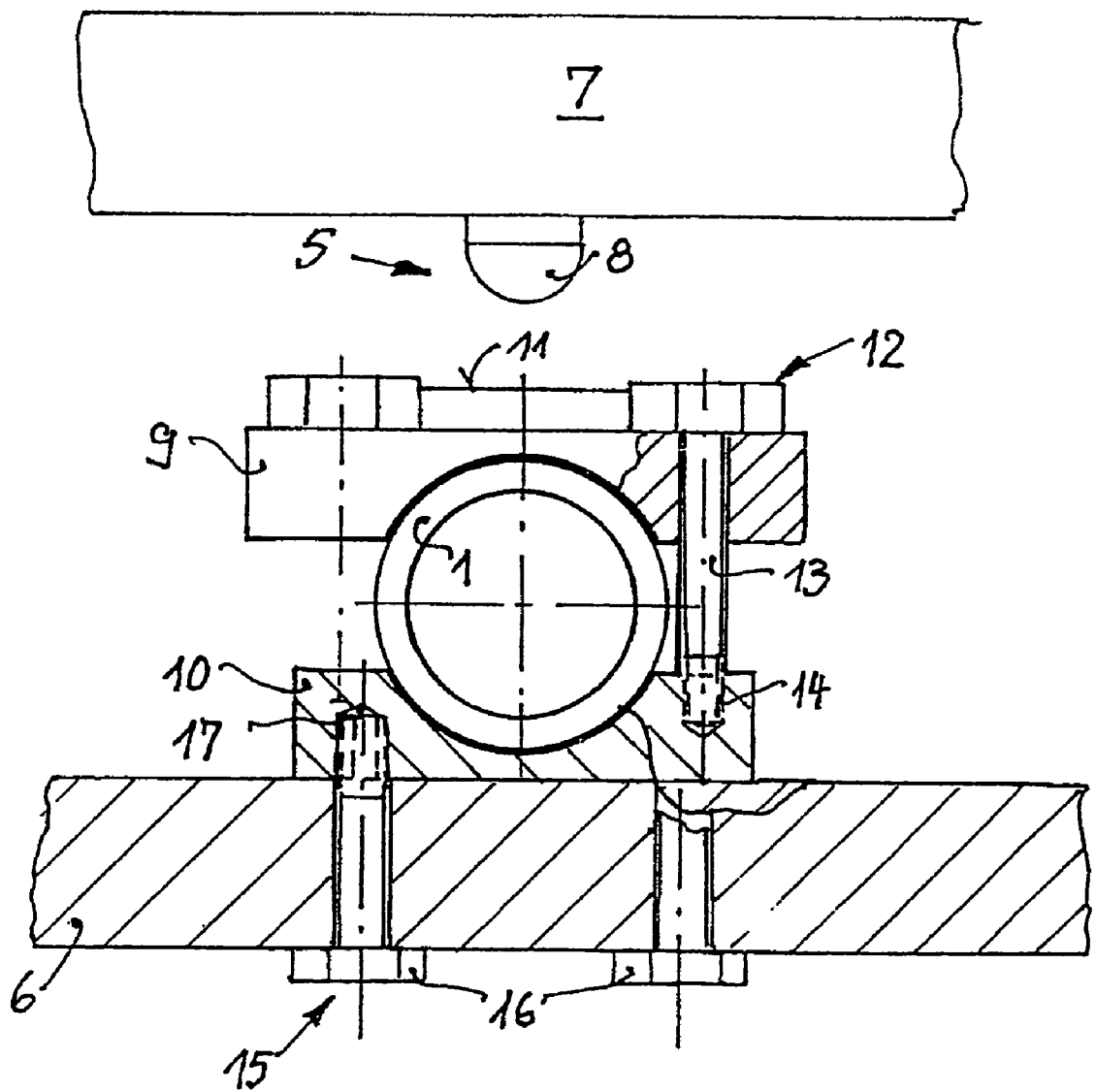
FIG. 5 is a schematic cross-sectional view taken along a partially offset sectional line V—V illustrated in FIG. 2, functional elements associated with the flanged plates for axle support which are assigned as axle-side counterelements to the axle body being illustrated, opposite one another, in the form of stop buffers.

In this respect, reference is made to FIG. 5 which, in a highly schematic illustration, illustrates the frame member 7 and the elastic stop buffer 8 provided on the latter and forming a functional element. The stop buffer 8 is assigned, opposite it, as a functional part, a stop 11 which is provided on the flanged plate 9 which, as an integral part of the counterelement, forms a mounting part.

The screw connection 12, which, in the exemplary embodiment, defines the fastening plane 21, is illustrated by the screw bolts 13, of which two are provided, arranged in, as a fastening plane 21, a plane parallel to the longitudinal mid-plane 2 of the vehicle or to the transverse mid-plane of the axle. The screw bolts 13 span the axle body 1 on opposite sides and engage in receiving bores 14 of the flanged plate 10.

In the exemplary embodiment illustrated, the flanged plate 10 is connected to the axle body 1 in a form-fitting or materially integral manner, for example, by welding, and itself forms the fastening for a side member 6, the side member being screwed from below against the flanged plate 10, and this fastening screw connection, designated as a whole by 15, being formed by four screw bolts 16 which, passing through the side member 6, are screwed into downwardly open blind-hole bores 17 of the flanged plate 10. The four screw bolts 16 of the screw connection of the side member 6 are assigned to the corner points of the flanged plate 10 and are arranged opposite one another in pairs laterally in relation to the axial body 1, e.g., the screw bolts 13 of the screw connection 12 which define the fastening planes 21 engaging into the flanged plate 10 in each case approximately centrally between two screw bolts 16.

In relation to the fastening plane 21, as a result of a first example embodiment according to the present invention, the flanged plate 9 may be arranged so as to be offset at 180°, presupposing a corresponding shape of the axle body, as a comparison of FIGS. 1, 2 and 3, 4 illustrates. This 180°-offset arrangement of the flanged plate 9 on the axle body 1, in conjunction with the flanged plate 9 being arranged asymmetrically to the fastening plane 21, with, as a functional part located opposite the stop buffer 8, a stop 11 offset to one side in relation to the fastening plane 21, makes it possible that, with the fastening plane 21 being in the same position in relation to the axle body, the stop 11 may be positioned in two positions offset along the longitudinal center line 3 of the axle body and consequently at a different distance from the axle transverse mid-plane. As a result, with the construction of the axle otherwise being unchanged, a coordination with fixed stops, such as the stop buffer 8, arranged at a different distance from one another in the transverse direction of the vehicle may take place, that is to say, with these stop buffers 8 being assigned to frame side members 7, an adaptation to different frame structures may be carried out.

As already indicated, contrary to the exemplary embodiment illustrated, the same is also possible accordingly with regard to the flanged plate 10, so that, in application of the foregoing according to the present invention, diverse adaptation possibilities are possible.

Figure 2:
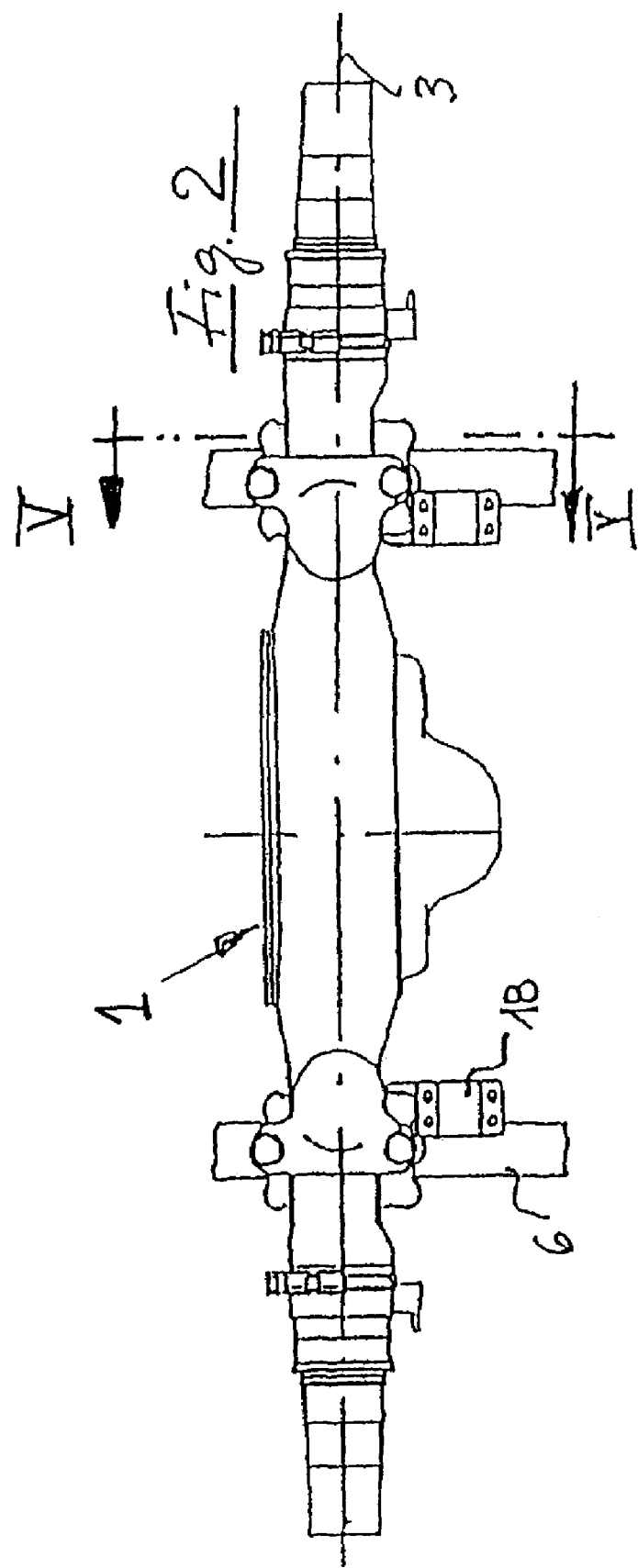
FIG. 2 is a top view of the illustration according to FIG. 1.
Figure 3:
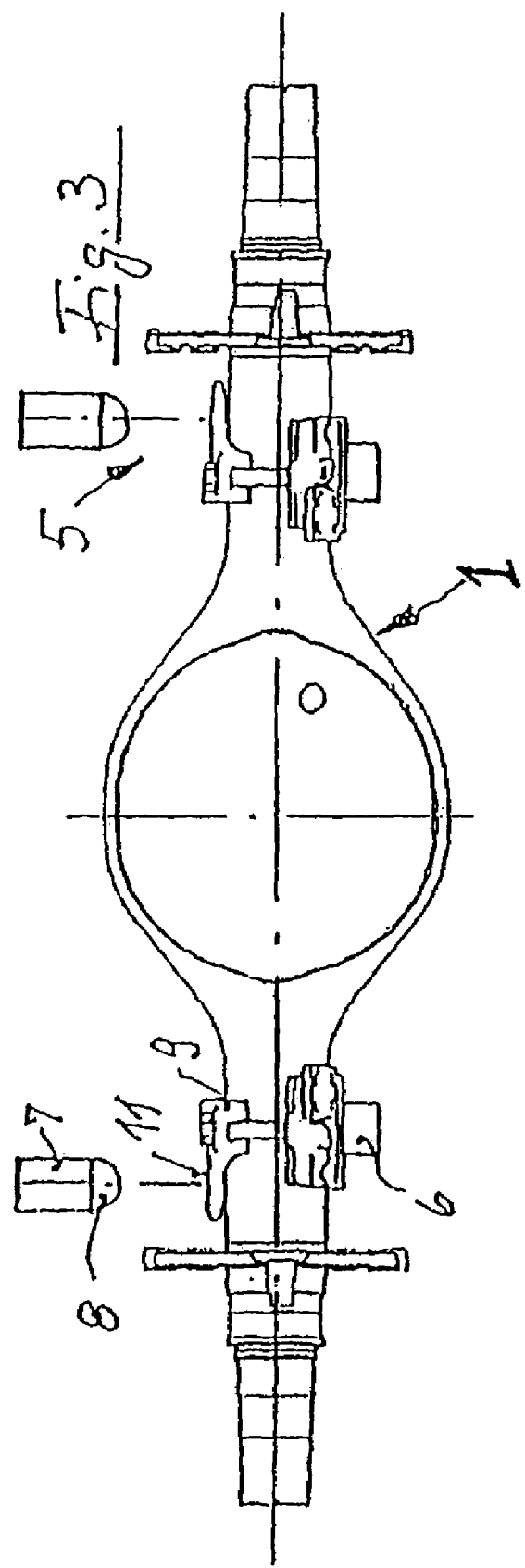
Figure 4:
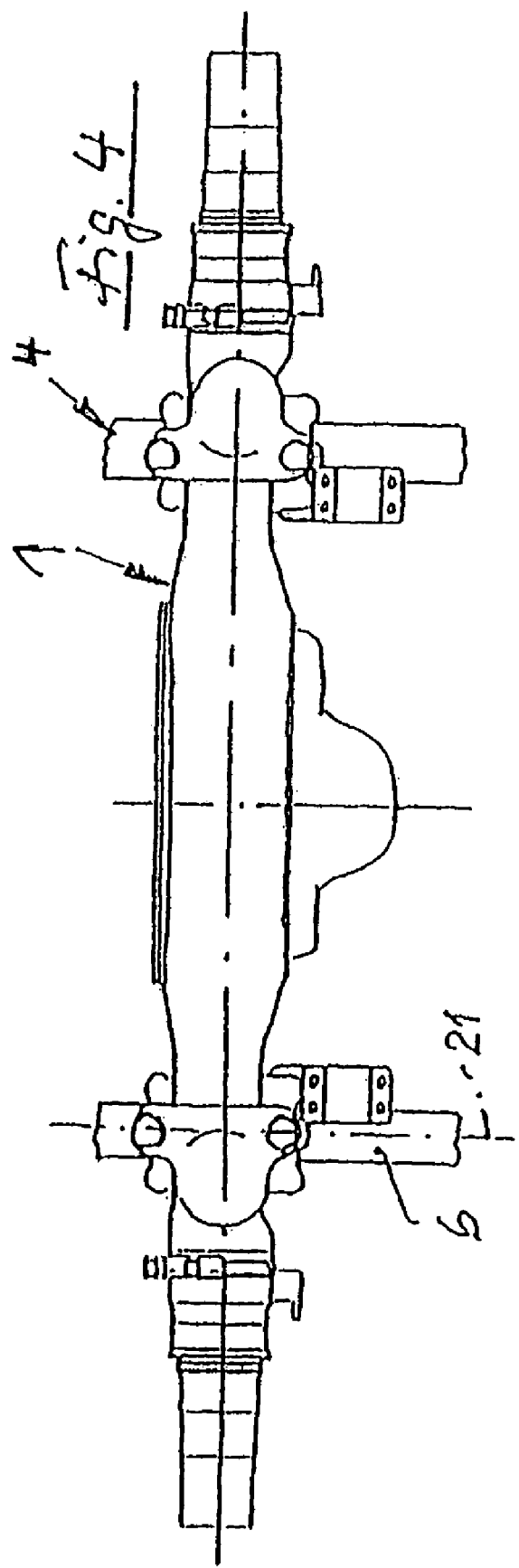
FIG. 4 is a top view of the illustration according to FIG. 3.

A further possibility according to the present invention is to position the flanged plate 9, while maintaining its alignment with the axle body 1, that is to say with respect to the position of its stop 11 forming the functional part in relation to the fastening plane 21 in the direction of the axle longitudinal mid-plane, on different sides with respect to the axle transverse mid-plane 2, such that, starting from a position of the stop 11 between the fastening plane and the axle transverse mid-plane on one axle side, for example, the left-hand axle side in relation to FIGS. 1 and 2, a position of the stop 11 on that side of the fastening plane 21 which is remote from the axle transverse mid-plane 2 is obtained on the other axle side, as illustrated on the right-hand side in FIGS. 3 and 4. By virtue of such a crosswise interchange and/or by virtue of the transposition due to an arrangement offset at 180°, with the respective axle side being maintained, this may result, in conjunction with correspondingly transposable flanged plates, in diverse possibilities for position adaptation, in each case presupposing corresponding cross-sectional and/or dimensional conditions of the axle body 1 and/or of the flanged plate 9.

Particularly in conjunction with axle bodies produced in the sheet-metal form of construction, it may be provided to connect one flanged plate to the axle body in a materially integral manner, for example, by welding. It is also within the scope of the present invention, however, for one of the flanged plates, to carry out, with respect to the axle body, a longitudinally and/or rotationally secure form-fitting fixing in relation to the longitudinal center line 3.

In particular, FIGS. 2 and 4 illustrate that, e.g., the mounting for a transverse stabilizer, which mounting is designated here by 18, may be connected to the flanged plate 10 secured to the axle body 1 in a form-fitting or materially integral manner.

What is claimed is:

1. An axle for a vehicle, comprising:
   an axle body;
   at least one of (a) an axle guidance device and (b) an axle support device; and
   an arrangement located on both sides of an axle transverse mid-plane, the arrangement including mounting parts connected releasably to the axle body and a stop corresponding positionally to at least one of (a) the axle guidance device and (b) the axle support device and offset to a fastening plane of the mounting parts;
   wherein each of the mounting parts is arranged with respect to the axle body such that the mounting parts can be selectively mounted with the offset of the stop in either one of: a direction towards the axle transverse mid-plane, or a direction away from the axle transverse mid-plane, with the stop arrangeable at different distances from the axle transverse mid-plane.

2. The axle according to claim 1, wherein the mounting parts include a flanged plate.

3. The axle according to claim 1, wherein the mounting parts include flanged plates configured to be braced against the axle body.

4. The axle according to claim 3, wherein the flanged plates are braced against the axle body by screw connectors that define the fastening plane.

5. The axle according to claim 4, wherein axes of the screw connections define a respective fastening plane.

6. The axle according to claim 1, wherein the mounting parts include flanged plates fastenable in positions in relation to the axle body offset at 180° to one another in relation to the fastening plane.

7. The axle according to claim 1, wherein the mounting parts include flanged plates located opposite one another with respect to the axle transverse mid-plane with maintained alignment with the axle body transposable between mutually opposite axle sides of the axle body so that, starting from a position of a respective stop between the fastening plane and the axle transverse mid-plane on one axle side, a position of the stop on a side of the fastening plane remote from the axle transverse mid-plane is obtained on another axle side.

8. The axle according to claim 1, wherein the mounting parts include a flanged plate, the flanged plate including a stop surface configured to limit a spring excursion of the axle body relative to a body.

9. The axle according to claim 1, wherein the mounting parts include a flanged plate, the flanged plate configured as a clamping part for the at least one of (a) the axle-support device and (b) the axle-guidance device.

10. The axle according to claim 9, wherein the at least one of (a) the axle-support device and (b) the axle-guidance device includes a leaf spring.

11. The axle according to claim 9, wherein the at least one of (a) the axle-support device and (b) the axle-guidance device includes a spring carrier.

12. The axle according to claim 1, wherein the mounting parts include a first flanged plate that forms the stop, the axle further comprising opposite the first flanged plate a second flanged plate connected unreleasably to the axle body, the second flanged plate arranged as a clamping partner of the first flanged plate to the axle body.

13. The axle according to claim 1, wherein the mounting parts include a first flanged plate including the stop, the axle further comprising opposite the first flanged plate a second flanged plate connected releasably to the axle body, the second flanged plate arranged as a clamping partner of the first flanged plate to the axle body.

14. The axle according to claim 1, wherein the fastening plane is defined by a screw connection between flanged plates and forms a plane of symmetry of a fastening screw connection of one of an axle guide and an axle support to the axle body.

15. The axle according to claim 14, wherein reciprocal screw connections start from opposite sides of the axle body.

16. The axle according to claim 15, wherein screw elements of the screw connections include screw bolts.

17. The axle according to claim 16, wherein the screw bolts of the one of the axle-support and axle-guidance fastening screw connection arranged on an underside in relation to the axle body are screwed into blind-hole bores of an associated flanged plate.

18. The axle according to claim 2, wherein the flanged plate is connected to the axle body in an integral manner.

19. The axle according to claim 2, wherein the flanged plate is welded to the axle body.

20. The axle according to claim 2, wherein the flanged plate is configured to perform at least one of a longitudinally and rotationally secure form-fitting fixing of the mounting parts in relation to a longitudinal center line of the axle body.

* * * * *